United States Patent
Marriott et al.

(10) Patent No.: US 7,648,171 B2
(45) Date of Patent: Jan. 19, 2010

(54) SEAT BELT BUCKLE SYSTEM AND SCABBARD

(75) Inventors: Brandon S. Marriott, Waterford, MI (US); David E. Sanders, Shelby Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 388 days.

(21) Appl. No.: 11/730,554

(22) Filed: Apr. 2, 2007

(65) Prior Publication Data

US 2008/0238074 A1    Oct. 2, 2008

(51) Int. Cl.
*B60R 22/28*     (2006.01)

(52) U.S. Cl. .................... 280/805; 280/801.1; 280/806; 297/468; 297/470; 297/471; 297/472; 297/480; 297/482

(58) Field of Classification Search ................ 280/805, 280/806, 801.1; 297/468, 470, 471, 472, 297/480, 482
See application file for complete search history.

(56) References Cited

U.S. PATENT DOCUMENTS

| 3,550,955 | A | * | 12/1970 | Chamberlain et al. | ........ 297/482 |
| 5,707,080 | A | * | 1/1998 | Isaji et al. | .................... 280/806 |
| 6,126,241 | A | * | 10/2000 | Wier | ......................... 297/482 |

\* cited by examiner

*Primary Examiner*—Eric Culbreth
(74) *Attorney, Agent, or Firm*—Foley & Lardner LLP

(57) ABSTRACT

A seat belt buckle system includes a seat belt with a latch plate, and a seat belt buckle assembly. The seat belt buckle assembly includes a buckle head for receiving the latch plate, a scabbard covering a portion of the buckle head, and a buckle stalk connecting the buckle head to a vehicle body portion. The scabbard includes at least one tear seam located at an intersection of the first wall and the third wall. The scabbard is configured such that a separation force of the tear seam is less than a buckling load of the scabbard, such that when the buckle is impacted and undergoes a shock load during buckle pretensioning, the tear seam will separate and allow the buckle head to slide down the ramped surface preventing a shock load from a hard contact point that would cause the latch plate to delatch from the buckle head.

17 Claims, 5 Drawing Sheets

SEAT BELT BUCKLE SYSTEM AND SCABBARD

BACKGROUND

The present invention relates generally to the field of seat belt buckles. More specifically, the present invention relates to the field of buckle scabbards for seat belt buckle systems in which the scabbard is configured to prevent disengagement of a latch plate to a buckle head.

Conventional seat belt buckle systems generally include a seat belt with a latch plate, and a pretensioner that is connected to a seat belt buckle. The buckle assembly includes a buckle head, a stalk that connects the buckle head to either a vehicle component or a pretensioner, and a scabbard that covers part of the stalk and buckle. In conventional seat belt buckle systems, when the system undergoes shock loading, the latch plate may be disengaged, thereby allowing an occupant's seat belt buckle to become unlatched. The shock loading can be caused by hard contact between a pretensioner accelerated buckle head and vehicle components. The shock loading can be caused by firing of the pretensioner, which imparts a sudden acceleration to the buckle head that is partially resisted by the scabbard. Shock loading can also be caused by contact between a buckle head in motion, when the pretensioner fires and reels in the stalk and forces the buckle head to move towards the pretensioner, and a hard portion of a vehicle seat. The shock load may also be caused by a sudden deceleration of the buckle head at the end of the pretensioner's stroke. Further, in conventional seat belt buckle systems, the scabbard is crushed axially as the stalk shortens, such as during a shock loading, which prevents the scabbard from offering any protection of the buckle head.

SUMMARY

An exemplary embodiment relates to a seat belt buckle assembly. The seat belt buckle assembly comprises a buckle head, a buckle stalk connecting the buckle head to a vehicle component, and a scabbard covering a portion of the buckle head and a portion of the buckle stalk. The scabbard includes a tear seam.

Another embodiment relates to a seat belt buckle system. The seat belt buckle system comprises a seat belt with a latch plate and a pretensioner operably connected to a seat belt buckle assembly. The buckle assembly includes a buckle head configured to receive and latch with the latch plate, a buckle stalk connecting the buckle head to the pretensioner, and a scabbard covering a portion of the buckle head and a portion of the buckle stalk. The scabbard includes a tear seam.

Yet another embodiment relates to a seat belt buckle system. The system comprises a seat belt with a latch plate configured to latch to a buckle head of a seat belt buckle, and a pretensioner operably connected to the seat belt buckle. The seat belt buckle includes a scabbard covering a portion of the buckle head. The scabbard includes an upper end area and a bottom end area, the bottom end area including walls thicker than the upper end area. The scabbard is configured to prevent delatching of the latch plate to the buckle head by providing a ramp feature that prevents the buckle head from being shock loaded during a pretensioning event.

Another embodiment relates to a seat belt buckle system. The seat belt buckle system comprises a seat belt with a latch plate configured to latch to a buckle head of a seat belt buckle, a pretensioner operably connected to the seat belt buckle, and the seat belt buckle including a scabbard covering a portion of the buckle head. The scabbard includes at least one tear seam at an upper end area of the scabbard. When the buckle undergoes a shock load and begins to translate after the pretensioner initiates, the tear seam separates, and a ramp surface in the scabbard prevents the latch plate from delatching from the buckle head.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

A seat belt buckle system may include a seat belt with a latch plate that can removably latch to a buckle head of a seat belt buckle. At least a portion of the buckle head is covered by a scabbard. According to an embodiment of the invention, the seat belt buckle system is configured to prevent the latch plate from disengaging from the buckle head during pretensioning by a scabbard design that eliminates hard contacts that could cause a shock load from one or more of several sources when the buckle head undergoes a shock load.

As used herein, the term "connect" can refer to direct or indirect connection, unless otherwise specified.

Embodiments of the invention will now be described with reference to the drawings.

Figure 1:
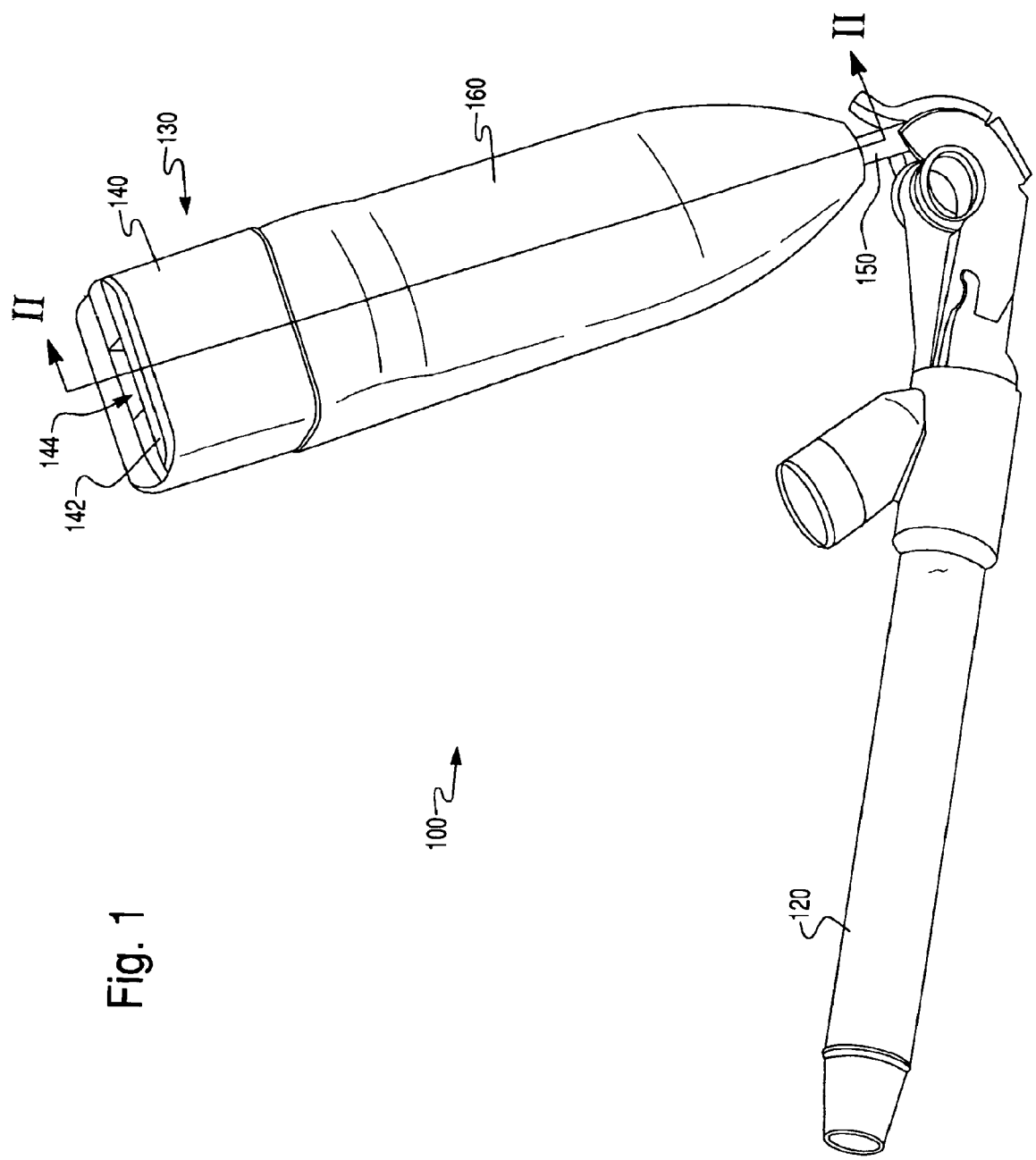
FIG. 1 is a perspective view of a seat belt buckle assembly attached to a pretensioner according to an embodiment of the invention.
Figure 2:
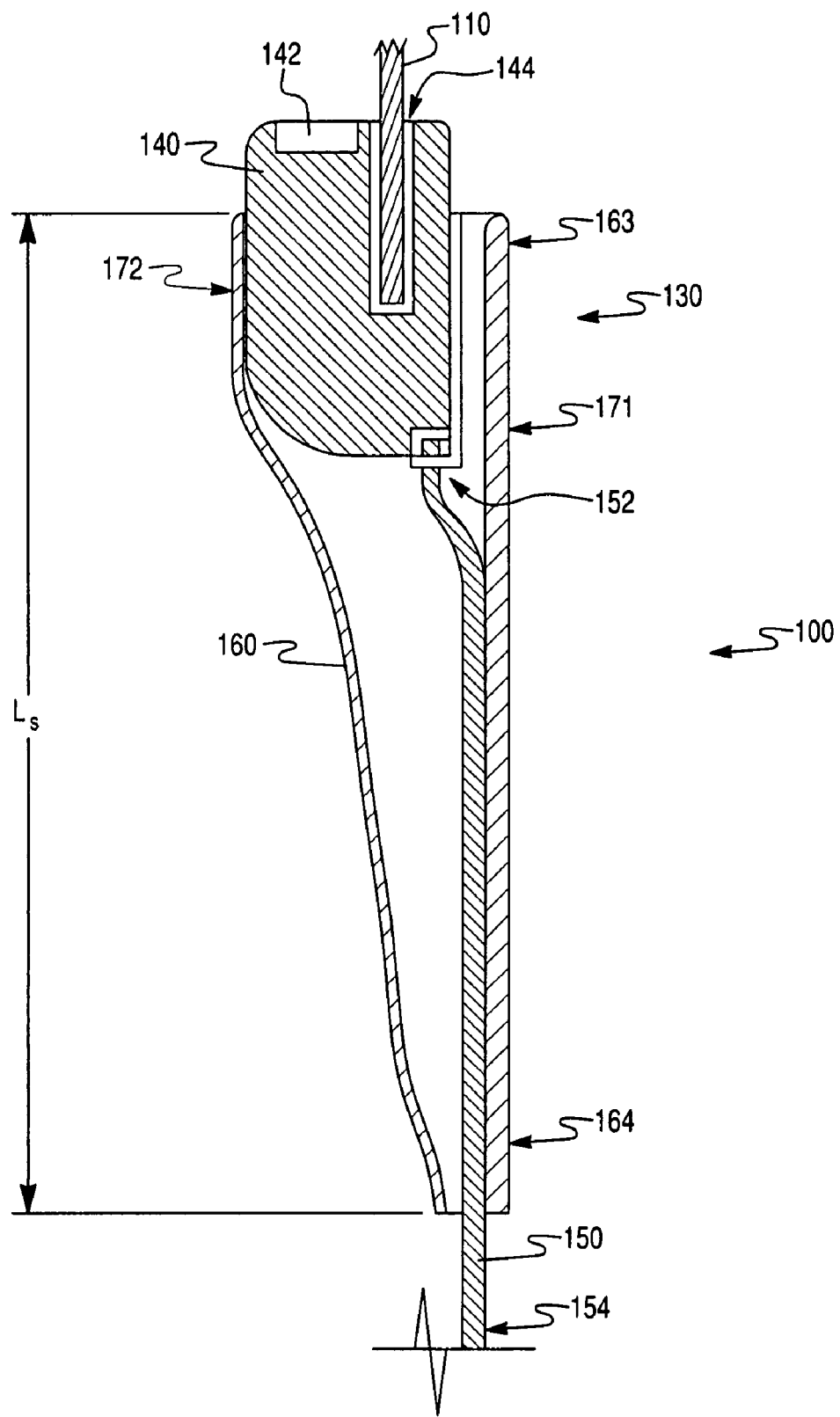
FIG. 2 is a cross-sectional view of a seat belt buckle assembly taken along line II-II in FIG. 1, in which a tongue is inserted into a buckle head.

FIGS. 1 and 2 illustrate a seat belt buckle system 100. The system 100 includes a seat belt (not shown) with a latch plate 110 that is configured to be removably latched to a seat belt buckle 130. The buckle 130 includes a buckle head 140, scabbard 160 covering at least a portion of the buckle head 140, and a buckle stalk 150. In FIGS. 1 and 2, other vehicle components, such as a vehicle seat, are not shown for sake of clarity.

The buckle head 140 includes a buckle head receiving aperture 144 for receiving the latch plate 110 and in which the latch plate 110 is latched to the buckle head 140. The buckle head 140 also includes a release button 142. A vehicle occupant can depress the release button 142 to release (unlatch) the latch plate 110 from the buckle head 140. The latching mechanism to latch and unlatch the latch plate 110 with the buckle head 140 is well known in the art.

The stalk 150 connects the buckle head 140 to a vehicle component, such as a pretensioning device 120. A proximate end 152 of the stalk 150 connects to the buckle head 140. A distal end 154 of the stalk 150 connects to the pretensioner 120, such as shown in FIG. 1. The stalk 150 can be a cable, strap, webbing, or any other suitable device or material. The stalk 150 could be, for example, 400 mm long. Alternatively, the stalk 150 can be any other suitable length, (longer or shorter). The length of the stalk 150 can be determined by the desired length of the buckle stroke, vehicle seating configuration, vehicle packaging, or other factors. For example, a longer stalk 150 can allow a longer distance (i.e., stroke) for the buckle 130 to move when the pretensioner 120 is activated, depending on the design of the pretensioner 120.

When the pretensioner 120 is initiated (such as during a vehicle collision), the pretensioner 120 pulls the distal end 154 of the stalk 150 in a direction towards the pretensioner 120 and away from the upper end area 163 of the scabbard 160. This motion of the stalk 150 and seat belt buckle 130 is sometimes referred to as a "buckle stroke." During this pulling motion of the stalk 150, the buckle head 140 is accelerated and moved within the scabbard 160. During this translation movement, the buckle head 140 and/or scabbard 160 can receive a shock load from impacting a vehicle component (such as a seat or other object in the vehicle).

In conventional buckle pretensioner seat belt buckle systems, the shock load could cause the latch plate to disengage from the buckle head. Delatching of the latch plate can occur when the contact of the buckle head with a vehicle component is sufficiently high to provide enough resistance to "de-weight" the internal buckle mechanism that prevents motion of the buckle release button relative to the latch plate. The "de-weighting" of the mechanism generally occurs when the shock load has a steep acceleration curve that spans only a fraction of a second, allowing the inertia of the release button 142 to translate within the buckle 130 and release the latch plate 110.

In the seat belt system, the scabbard 160 is configured to minimize or prevent these shock loads and preserve the position of the release button 142 by minimizing the opportunity for the latching mechanism to "de-weight" and release the latch plate 110. In embodiments of the invention, the scabbard 160 includes at least one tear seam 161. The tear seam 161 is configured to tear open and absorb at least a portion of the shock load of the initial pretensioner 120 initiation to prevent disengagement of the latch plate 110 from the buckle head 140. The minimum separation force required to separate (tear) the tear seam(s) 161, 162 is less than a buckling (or crushing) load of the scabbard 160. Thus, in an embodiment, the scabbard 160 will tear along its tear seam(s) 161, 162 and not crush or buckle during a shock load, unlike conventional designs that do not include tear seams.

Figure 3:
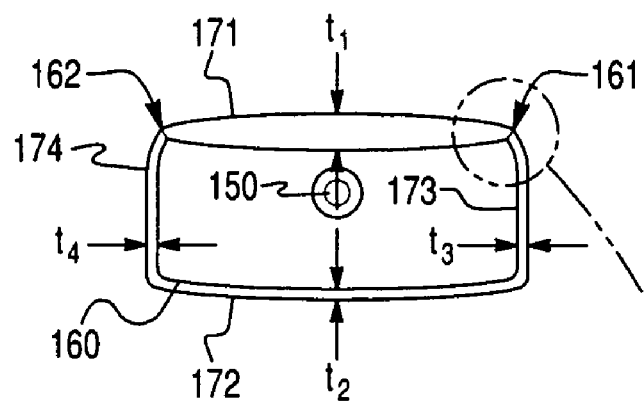
FIG. 3 is a top plan view of the seat belt buckle scabbard illustrating a tear seam.
Figure 4:
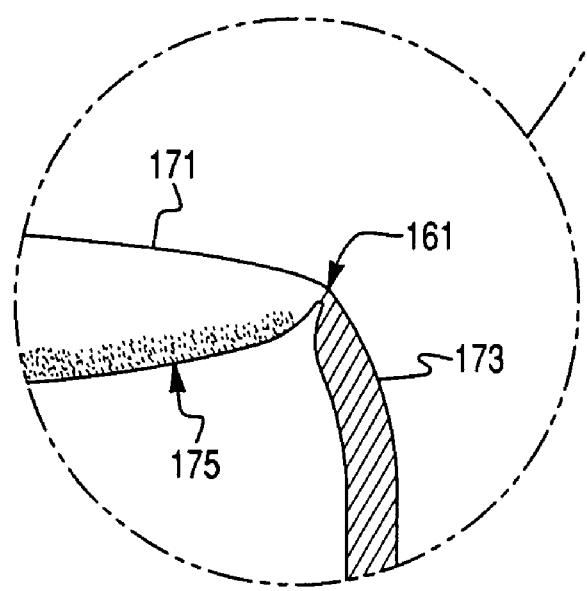
FIG. 4 is a detail view of the seat belt buckle scabbard of FIG. 3 illustrating the tear seam and interior surface of the scabbard.
Figure 5:
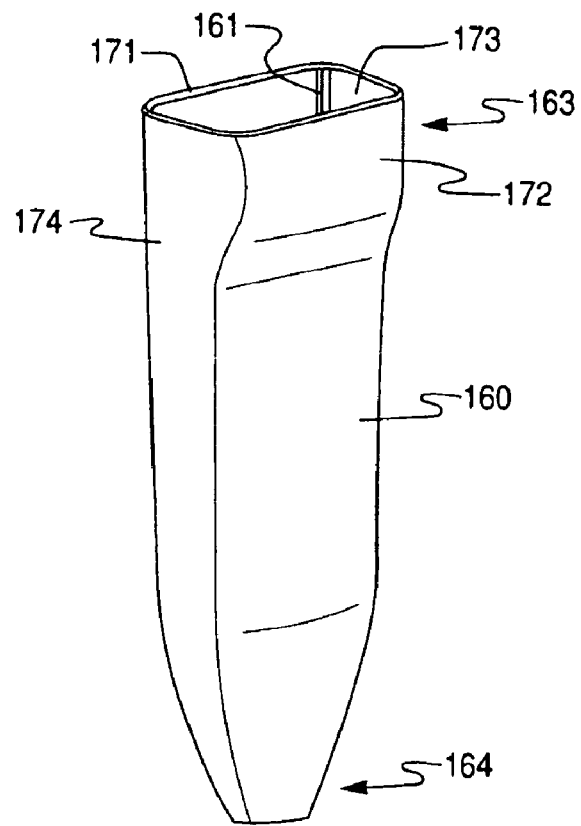
FIG. 5 is a front perspective view of a seat belt buckle scabbard.

The scabbard 160 partially covers the buckle head 140 and a portion of the buckle stalk 150. As shown in FIG. 3, the scabbard 160 includes a first wall 171, a second wall 172 opposite the first wall 171, a third wall 173 extending between the first and second walls 171, 172, and a fourth wall 174 opposite the third wall 172 and extending between the first and second walls 171, 172.

The first wall 171, according to an embodiment, is thicker than the third and fourth walls 173, 174. The first wall 171 is positioned in a vehicle to be facing towards an occupant. The first wall 171 can be configured to guide the buckle head 140 as the buckle head 140 slides along inside the scabbard 160 during a buckle stroke. As the tear seams 161, 162 separate, the wall 171 provides a smooth path for the translation of the buckle head 140 due to the "ramp" effect that the thick wall 171 provides over obstructions and/or interferences in the sliding path for the buckle head 140, and prevents sudden deceleration(s) due to contact with other vehicular components.

The walls 171, 172, 173, 174 of the scabbard 160 have a top end area 163 and a bottom end area 164. In one embodiment, the walls 171, 172, 173, 174 of the bottom end area 164 are thicker than the corresponding walls 171, 172, 173, 174 in the top end area 163. Alternatively, the second wall 172, third wall 173, and fourth wall 174 in the bottom end area 164 are thicker than the corresponding walls 172, 173, 174 in the top end area 163. In yet another embodiment, the scabbard 160 can include structural ribs, or any other suitable design.

In another embodiment, the thickness $t_1$, $t_2$, $t_3$, $t_4$ of at least one of the walls 171, 172, 173, 174 in the bottom end area 164 and/or top end area 163 are in a range of 0.7 mm to 4 mm. Alternatively, the thickness $t_1$, $t_2$, $t_3$, $t_4$ of at least one of the walls 171, 172, 173, 174 in the bottom end area 164 and/or top end area 163 are greater than 0.7 mm. Alternatively, the thickness $t_1$, $t_2$, $t_3$, $t_4$ of at least one of the walls 171, 172, 173, 174 in the bottom end area 164 and/or top end area 163 are in a range of 2 to 4 mm. Alternative, the thickness $t_1$, $t_2$, $t_3$, $t_4$ of at least one of the walls 171, 172, 173, 174 in the bottom end area 164 and/or top end area 163 are about 3 mm.

Alternatively, the thickness $t_1$, $t_2$, $t_3$, $t_4$ of at least one of the walls 171, 172, 173, 174 in the bottom end area 164 are 10 to 200 percent thicker than the corresponding walls 171, 172, 173, 174 in the top end area 163. For exemplary purposes only, the top end area 163 may be approximately 2.0 mm thick and the bottom end area 164 may be approximately 6.0 mm thick. In yet another alternative, the thickness $t_1$, $t_2$, $t_3$, $t_4$ of at least one of the walls 171, 172, 173, 174 in the bottom end area 164 are 40 to 70 percent thicker than the corresponding walls 171, 172, 173, 174 in the top end area 163.

An interior surface 175 of the scabbard 160 can include a textured surface. The textured surface can decrease friction to allow for smoother movement of the buckle head 140 within the scabbard 160. The textured surface can comprise a grained surface, such as a random "stipple" grain. Alternatively, the textured surface can comprise one or more narrow ribs. Alternatively, any other suitable type of texturing may be used. The textured surface decreases the surface area of the scabbard 160 that must contact the buckle head 140 when the buckle head 140 is sliding (moving) within the scabbard 160. The interior surface 175 can act as a ramp or guide when the pretensioner 130 accelerates the buckle head 140. The textured surface can be on the interior surface 175 of the first wall 171 and/or any other wall 172, 173, 174.

The scabbard can be formed of thermoplastic olefin (TPO), thermoplastic elastomer (TPE), polyester, polypropylene, or any other suitable material. The scabbard 160 can be injection molded or extruded, or manufactured in any other suitable manner.

A first tear seam 161 is positioned at an intersection (or boundary) of the first wall 171 and third wall 173 of the scabbard 160. A second tear seam 162 is positioned at an intersection of the first wall 171 and the fourth wall 174. The tear seams 161, 162 allow the scabbard 160 to separate when the pretensioner 130 is initiated so that the buckle head 140 can slide down into the scabbard 160 during a buckle stroke. The location of the tear seams 161, 162 at the intersection of two walls enables the scabbard 160 to tear in a controlled manner The boundary (intersection) of two walls may be a weaker location that other portions of the walls 171, 172, 173, 174. The tear seams 161 and/or 162 may alternatively be located in any other suitable location.

The tears seams 161, 162 can have a thickness of about 0.2 to 0.8 mm. Alternatively, the tear seams 161, 162 can have a thickness of about 0.3 mm. The tear seams 161, 162 can have a width $W_{ts}$ of about 1 mm. Alternatively, the tear seams 161, 162 can have a width $W_{ts}$ of about 0.8 mm to 2 mm. The tear seams 161, 162 can have a narrower bottom with a width $W_{ts}$ of about 0.8 mm to 1 mm and extend to a wider top portion of about 2 mm near a top edge of the scabbard 160. The tear seams 161, 162 can be formed with a v-notch, taper, chamfered corners, or by any other manner. The tear seams 161, 162 can have the same or different dimensions, configurations, or shape. The tear seams 161, 162 can be designed using common airbag tear seam technology and art.

The tear seams 161, 162 can be any suitable length. The length $L_{ts}$ of the tear seams 161, 162 can control the distance of the buckle stroke. For example, if it is desired to shorten the buckle stroke to 75 percent of the total possible stroke distance (determined by the length of the stalk 150 and/or design of the pretensioner 120), then the length $L_{ts}$ of the tear seams 161, 162 can be 75 percent of the total stroke distance. The tear seams 161, 162 will then reduce the total buckle stroke distance to 75 percent because, as the buckle 130 is stroking and the buckle head 140 is moving down with the scabbard 160, the tear seams 161, 162 are tearing open to absorb energy. When the ends of the tear seams 161, 162 are reached, the buckle head 140 will no longer be able to move downward with the scabbard 160, thus stopping the buckle stroke.

The tear seams 161, 162 can be any length $L_{ts}$ and up to about 110 percent of the buckle stroke length. The tear seams 161, 162 can have a length $L_{ts}$ equal to the distance for the total possible buckle stroke and/or the desired buckle stroke. Alternatively, the tear seams 161, 162 can be any length $L_{ts}$ up to the total length $L_S$ of the scabbard 160. The scabbard 160 can be any length relative to the desired stroke. For example, the scabbard 160 length can be equal to or longer than the length of the buckle stroke.

The tear seams 161, 162 (one or both) can have a length $L_{ts}$ of about 2 to 450 mm. Alternatively, the tear seams 161, 162 (one or both) can have a length $L_{ts}$ of about 40 to 150 mm, or in another embodiment, of about 50 to 100 mm.

Figure 7:
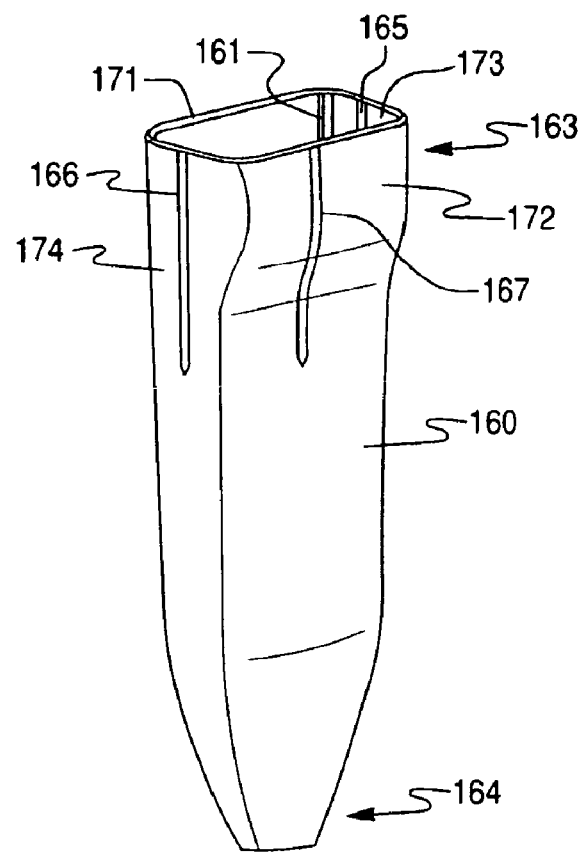
FIG. 7 is a front perspective view of a seat belt buckle scabbard according to another embodiment.
Figure 8:
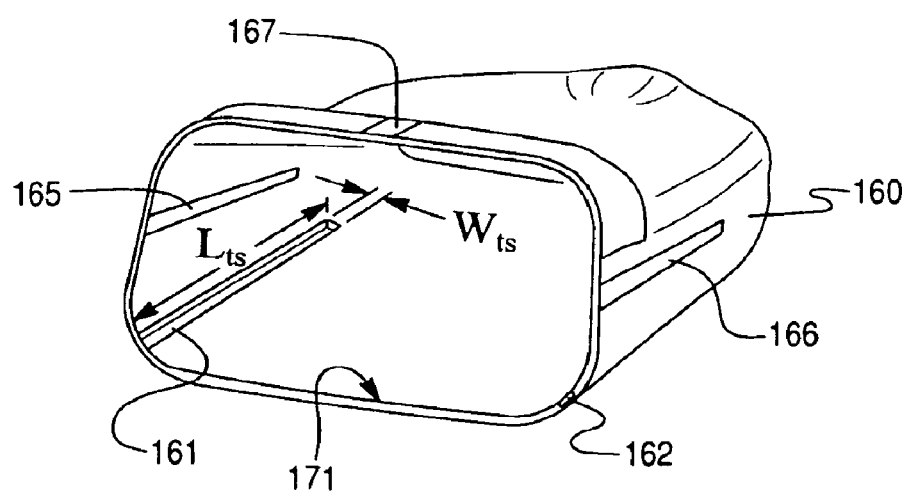
FIG. 8 is a top perspective view of the seat belt buckle scabbard of FIG. 7 illustrating further tear seam details.

FIGS. 7 and 8 illustrate another embodiment of a scabbard 160 in which the scabbard 160 includes a plurality of tear seams 161, 165, 166, and 167. The tear seam 161 is similar to the tear seam 161 described above. Tear seam 165 is positioned in a middle of third wall 173. Tear seam 166 is positioned along a portion of fourth wall 174. Tear seam 167 is positioned along a portion of second wall 172. It will be noted that the scabbard 160 can include any number of tear seams in any suitable location. For example, the scabbard 160 can include one, two, three, four, or five, or more tear seams. Furthermore, the tear seams can be positioned at an intersection of two walls, along a middle portion of a wall, or any other suitable location. Alternatively, any suitable combination of tear seams and locations may be utilized. Each tear seam may have the same or a different length and/or size.

According to an embodiment of the invention, by varying the length of the (one or more or all) tear seam(s) 161, 162, the distance of the buckle stroke can be controlled. A longer tear seam 161, 162 can allow a longer buckle stroke. If the tear seam(s) 161, 162 is shorter than the possible total stroke distance, then the buckle head 140 is stopped when the end of the tear seam 161, 162 is reached during the buckle stroke, thus limiting the total distance of the buckle stroke to a "desired" buckle stroke. In other words, when the tear seam 161, 162 finishes tearing, the buckle stroke can stop. During a shock load, the scabbard 160 is configured to tear open along its one or more tear seams 161, 162 in order to change the shape of the buckle acceleration curve and prevent the latch plate 110 from disengaging with the buckle 130. The scabbard 160 can also prevent hard contact between the buckle head 140 and a vehicle interior component, such as seat structure components or pretensioner components. The scabbard 160 can also protect the buckle head 140 and stalk 150 from undesirable customer interaction by covering portions of the buckle head 140 and stalk 150.

The scabbard 160 provides buckle head 140 acceleration management by the use and design of the tear seams 161, 162. For example, the shape, location, length, and/or material properties of the tear seams 161, 162 can provide a tailorable buckle stroke and deceleration rate of the seat buckle system 100 during activation of the pretensioner 120. The scabbard 160 acts as a shock absorber and dampener for the buckle head 140 and manages the inertia of the buckle head 140 at the end of the buckle stroke.

The scabbard 160 can be used in any suitable seat belt buckle system with any type of buckle pretensioner. Alternatively, the scabbard 160 design can be used in conjunction with seat belt anchors or lap pretensioners. The scabbard 160, in such circumstances, could be used to control anchor stroke distance and rate.

The scabbard 160 is shown with four walls. However, the scabbard 160 can comprise any suitable shape, design, or configuration. For example, the scabbard can be oval shaped, circular, triangular, or any other suitable shape. Thus, the scabbard 160 can have one, two, three, four, five, or more walls. The scabbard 160 can be tailored to fit a particular vehicle seat belt buckle system.

Figure 6:
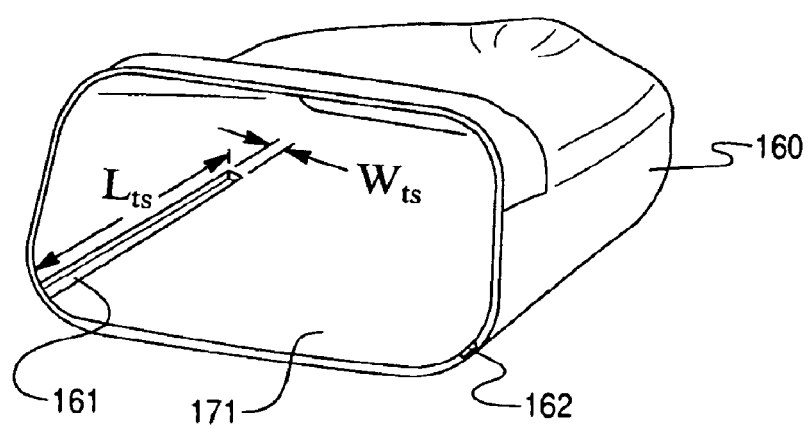
FIG. 6 is a top perspective view of the seat belt buckle scabbard of FIG. 5 illustrating further tear seam details.

Two tear seams 161, 162 are shown in FIGS. 3 and 6. Any suitable number, shape, and size of tear seams may be utilized in the seat belt buckle system 100.

The scabbard 160 may support the buckle stalk 150 and buckle head 140 to facilitate "one-handed buckling." The configuration of the seat belt system 110 can allow an occupant to engage the latch plate 110 with the buckle head 140 while using only one hand.

Although dimensions and relative dimensions are described herein, the figures are not drawn to scale and are exemplary only.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt buckle assembly, comprising:
   a buckle head;
   a buckle stalk connecting the buckle head to a vehicle component; and
   a scabbard covering a portion of the buckle head and a portion of the buckle stalk,
   wherein the scabbard includes a tear seam.

2. The seat belt buckle assembly of claim 1, wherein the scabbard includes:
   a first wall;
   a second wall opposite the first wall;
   a third wall extending between the first and second walls; and
   a fourth wall opposite the third wall and extending between the first and second walls, wherein the first wall is thicker than the third and fourth walls.

3. The seat belt buckle assembly of claim 2, wherein the tear seam is located in a wall of the scabbard.

4. The seat belt buckle assembly of claim 2, wherein the tear seam is located at an intersection of the first wall and the third wall.

5. The seat belt buckle assembly of claim 2, wherein the first wall is adjacent an occupant.

6. The seat belt buckle assembly of claim 2, further comprising a second tear seam located at an intersection of the first wall and the fourth wall.

7. The seat belt buckle assembly of claim 2, wherein the scabbard includes a top end area and a bottom end area; the thickness of each wall in the bottom end area is greater than the thickness of the corresponding wall in the top end area.

8. The seat belt buckle assembly of claim 2, wherein the thickness of each wall is uniform along the length of each wall.

9. The seat belt buckle assembly of claim 1, wherein a minimum separation force required to separate the tear seam is less than a buckling load of the scabbard.

10. The seat belt buckle assembly of claim 1, wherein the tear seam is configured to absorb shock for the buckle head at an end of a buckle stroke.

11. A seat belt buckle system comprising:
a seat belt with a latch plate; and
a pretensioner operably connected to a seat belt buckle assembly, the buckle assembly including:
a buckle head configured to receive and latch with the latch plate;
a buckle stalk connecting the buckle head to the pretensioner; and
a scabbard covering a portion of the buckle head and a portion of the buckle stalk,
wherein the scabbard includes a tear seam.

12. The seat belt buckle system of claim 11, wherein the scabbard includes a first wall, a second wall opposite the first wall, a third wall extending between the first and second walls, and a fourth wall opposite the third wall and extending between the first and second walls, and wherein the first wall is thicker than the third and fourth walls.

13. The seat belt buckle system of claim 12, wherein the tear seam is located at an intersection of the first wall and the third wall.

14. A seat belt buckle system, comprising:
a seat belt with a latch plate configured to latch to a buckle head of a seat belt buckle; and
a pretensioner operably connected to the seat belt buckle,
wherein the seat belt buckle includes a scabbard covering a portion of the buckle head and the scabbard including an upper end area and a bottom end area, the bottom end area including walls thicker than the walls of the upper end area, and
wherein the scabbard is configured to prevent delatching of the latch plate to the buckle head by providing a ramp feature that prevents the buckle head from being shock loaded during a pretensioning event, wherein an inside wall of the scabbard acts as the ramp feature, and wherein the buckle head slides along the inside wall ramp feature as a tear seam in the scabbard separates.

15. The seat belt buckle system of claim 14, wherein the walls of the bottom end area of the scabbard are 10 to 200 percent thicker than the walls of the upper end area.

16. The seat belt buckle system of claim 14, wherein the walls of the bottom end area of the scabbard are 40 to 70 percent thicker than the walls of the upper end area.

17. The seat belt buckle system of claim 14, wherein the walls of the bottom end area of the scabbard are approximately 3 mm thick.

* * * * *